US009790894B2

United States Patent
Chrabascz et al.

(10) Patent No.: US 9,790,894 B2
(45) Date of Patent: Oct. 17, 2017

(54) INNER HOUSING ASSEMBLY INCLUDING RETENTION SLOTS

(71) Applicant: Hamilton Sundstrand Corporation, Windsor Locks, CT (US)

(72) Inventors: Eric Chrabascz, Longmeadow, MA (US); William R. Fiske, Springfield, MA (US); David A. Dorman, Feeding Hills, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 1239 days.

(21) Appl. No.: 13/847,278

(22) Filed: Mar. 19, 2013

(65) Prior Publication Data

US 2014/0283521 A1    Sep. 25, 2014

(51) Int. Cl.
| | | |
|---|---|---|
| B64D 41/00 | (2006.01) | |
| H02K 5/06 | (2006.01) | |
| F02K 7/08 | (2006.01) | |
| F04D 19/00 | (2006.01) | |
| F04D 25/06 | (2006.01) | |
| F04D 29/64 | (2006.01) | |

(52) U.S. Cl.
CPC .............. *F02K 7/08* (2013.01); *B64D 41/007* (2013.01); *F04D 19/00* (2013.01); *F04D 25/0606* (2013.01); *F04D 29/644* (2013.01); *H02K 5/06* (2013.01)

(58) Field of Classification Search
CPC ......... F04D 29/644; F16M 1/025; H02K 5/06
See application file for complete search history.

(56) References Cited

U.S. PATENT DOCUMENTS

| | | | |
|---|---|---|---|
| 4,092,036 A | | 5/1978 | Sato et al. |
| 7,510,163 B2 * | | 3/2009 | Schlitzkus ............ B60T 8/3685 |
| | | | 248/548 |
| 7,798,768 B2 * | | 9/2010 | Strain ..................... F01D 9/042 |
| | | | 415/135 |
| 2014/0033734 A1 * | | 2/2014 | Lockhart ............... F04D 29/542 |
| | | | 60/796 |

FOREIGN PATENT DOCUMENTS

EP        2409919 A2    1/2012

OTHER PUBLICATIONS

European Search Report for related EP Application No. 14160312. 6-1607/2781759, dated Nov. 12, 2014, pp. 1-7.

* cited by examiner

Primary Examiner — Brian M O'Hara
(74) Attorney, Agent, or Firm — Cantor Colburn LLP

(57) ABSTRACT

A ram air fan assembly includes a motor/bearing housing that extends along a horizontal length of the ram air fan assembly. An inner housing assembly is in fluid communication with the motor/bearing housing to define a joint. The inner housing assembly includes first and second ellipse-shaped slots. The first slot is positioned at a first angle with respect to a radial axis of the inner housing assembly that is perpendicular to the horizontal length, and the second slot is positioned at a second angle with respect to the radial axis, the second angle being different from the first angle, and each slot extending along a first direction parallel to the horizontal length to define an axial width and extending along a radial axis to define a radial width being greater than the axial width.

3 Claims, 7 Drawing Sheets

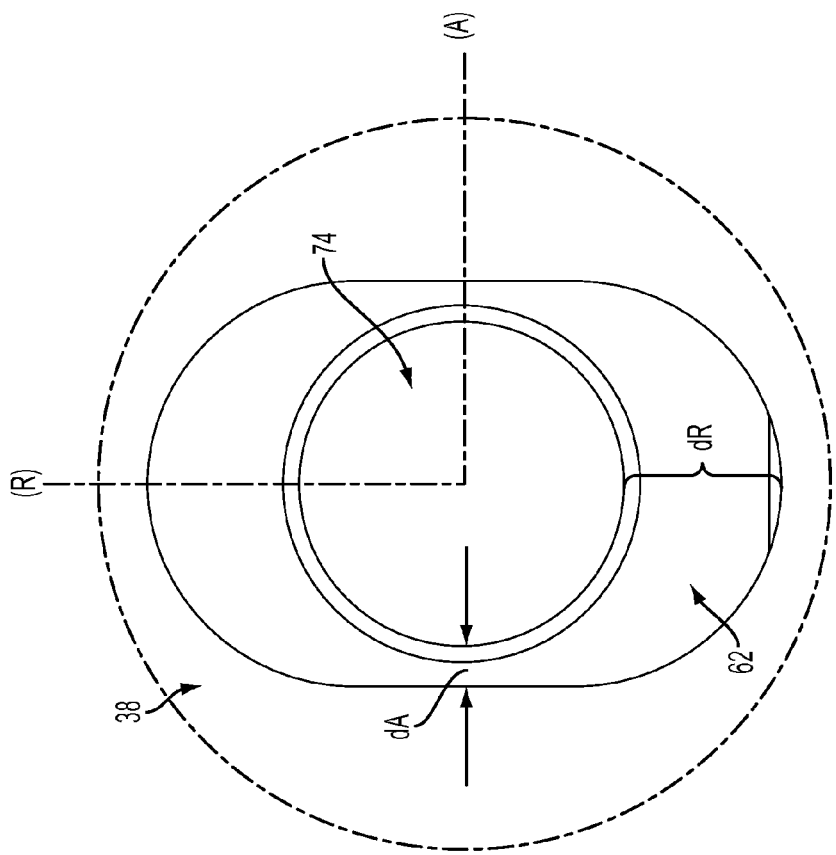
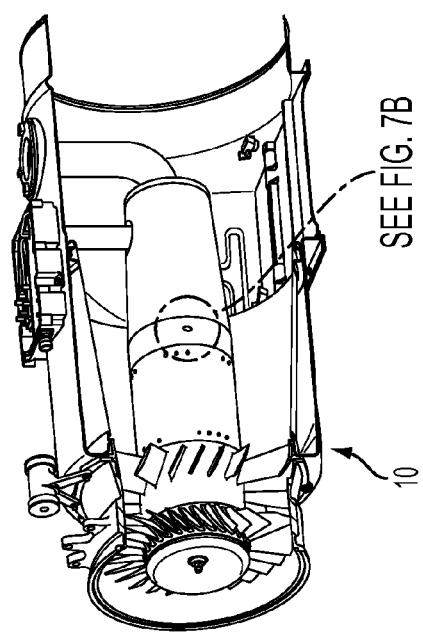
FIG. 7A
FIG. 7B ously pointed out and distinctly claimed in the claims at the conclusion of the specification. The foregoing and other features of the inventive teachings are apparent from the following detailed description taken in conjunction with the accompanying drawings in which:

INNER HOUSING ASSEMBLY INCLUDING RETENTION SLOTS

BACKGROUND

The present inventive teachings relate generally to a ram fan assembly, and more particularly, an inner housing assembly included with a ram fan assembly.

Ram air fan (RAF) assemblies traditionally include a motor/bearing housing and an inner housing assembly. The motor/bearing housing typically contains one or more bearings coupled to a shaft for driving a RAF unit, and a motor coupled to the shaft for generating rotation thereof. The inner housing assembly includes an inlet connected to a cool air duct and an outlet connected in fluid communication with the motor/bearing housing to deliver cool air over the motor and/or bearings to prevent over-heating.

During operation of the RAF assembly, the ram fan assembly generates a ram air flow, which flows across the outer surface of the motor/bearing housing and the inner housing assembly. As the speed of the ram air flow increases, the inner housing assembly may realize a shear force that promotes the inner housing assembly to move laterally away from the motor/bearing housing. Consequently, the shear force may cause the outlet of inner housing assembly to become disengaged from motor/bearing housing.

BRIEF DESCRIPTION

According to an embodiment of the present inventive teachings, a ram air fan assembly comprises a motor/bearing housing that extends along a horizontal length of the ram air fan assembly. An inner housing assembly is in fluid communication with the motor/bearing housing to define a joint therebetween. The inner housing assembly includes first and second ellipse-shaped slots. The first slot is positioned at a first angle with respect to a radial axis of the inner housing assembly that is perpendicular to the horizontal length. The second slot positioned at a second angle with respect to the radial axis such that the second angle is different from the first angle. Each slot extends along a first direction parallel to the horizontal length to define an axial width and extends along a radial axis to define a radial width being greater than the axial width. The ram air fan further includes first and second brackets. Each of the first and second brackets include a first end coupled to the motor/bearing housing and a second end coupled to the inner housing assembly to maintain coupling of the motor/bearing housing and the inner housing assembly at the joint. The second end of the first and second brackets includes a vertical channel aligned with one of the first and second slot. A first bolt is disposed through the first slot and into the vertical channel of the first bracket and a second bolt is disposed through the second slot and into the vertical channel of the second bracket. The first and second bolts couple the second end of the first and second brackets to the inner housing assembly.

In another embodiment, an inner housing assembly of a ram fan assembly comprises a cool air inlet to receive an air flow, an inner duct and an outlet. The inner duct extends horizontally between a first end and a second end to define a horizontal length. The first end is formed in fluid communication with the cool air inlet to receive the air flow therefrom. The outlet is formed in fluid communication with the second end of the inner duct to receive the air flow delivered therefrom. The outlet includes at least one slot formed therethrough to receive a bolt that couples the outlet to a bracket. The at least one slot is shaped as an ellipse that extends along a first direction parallel to the horizontal length to define an axial width and along a second direction perpendicular to the horizontal width to define a radial width being greater than the axial width.

In still another embodiment, a bracket to couple an inner housing assembly to a motor/bearing housing of a ram fan assembly comprises a body extending between first and second ends in a first direction extending parallel to a horizontal length of the ram fan assembly. A first channel is formed in the first end, and is configured to receive a first bolt to couple the first end to the motor/bearing housing. A second channel is formed in the second end. The second channel is configured to receive a second bolt to couple the second end to the inner housing assembly.

BRIEF DESCRIPTION OF THE DRAWINGS

The subject matter which is regarded as the inventive teachings is particularly pointed out and distinctly claimed in the claims at the conclusion of the specification. The foregoing and other features of the inventive teachings are apparent from the following detailed description taken in conjunction with the accompanying drawings in which:

FIGS. 7A-7B illustrate a clearance between a surface of the outlet and a bolt that fastens the inner housing bracket according to an embodiment.

DETAILED DESCRIPTION

Figure 1:
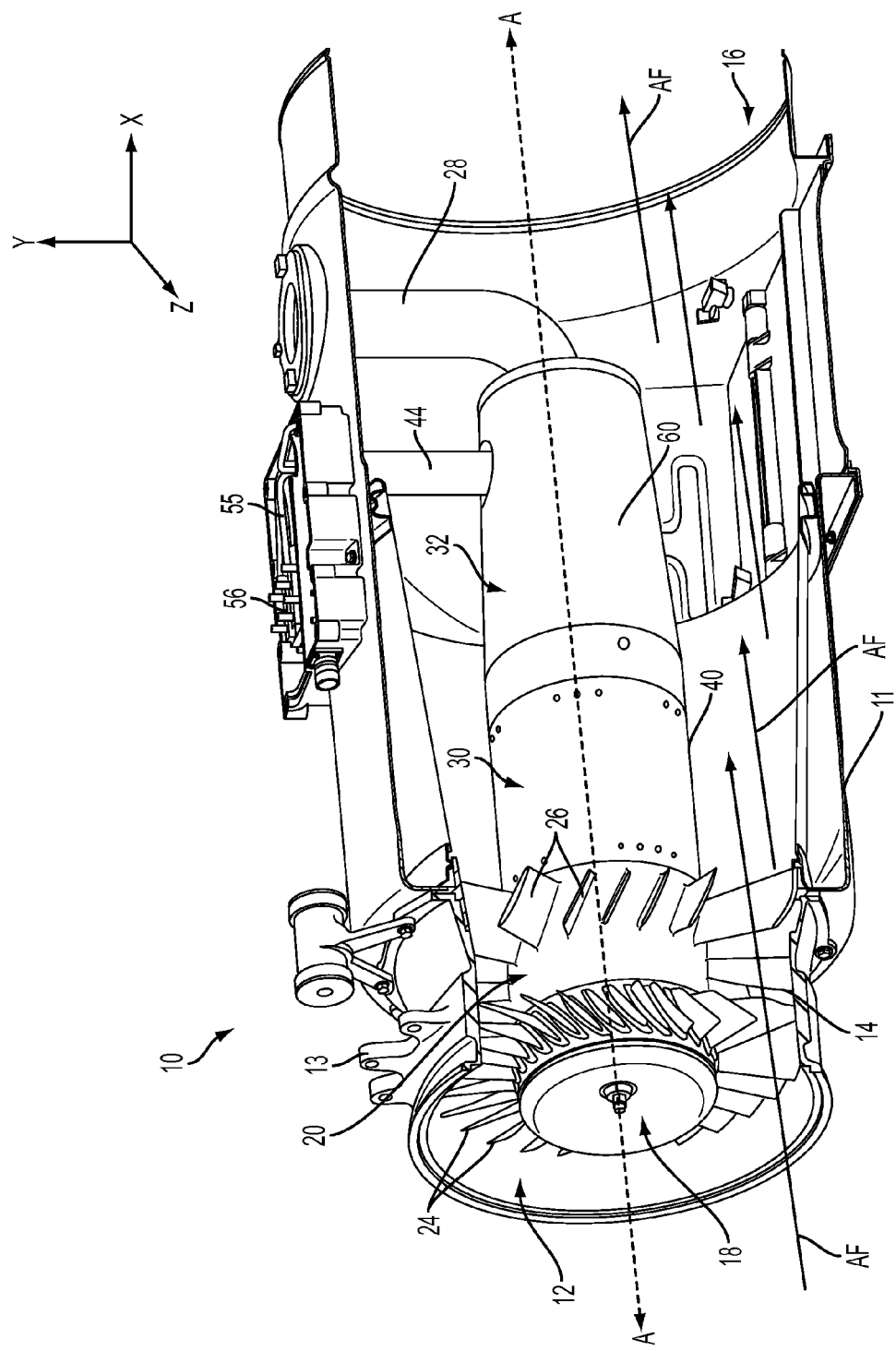
FIG. 1 is a diagram illustrating a ram fan assembly according to an embodiment.

Referring now to FIG. 1, a view of a ram fan assembly 10 is illustrated according to an embodiment. The ram fan assembly 10 includes an outer housing 11 that extends along a horizontal axis (A), i.e., X-axis direction, between a fan inlet 14 and a fan outlet 16. The ram fan assembly 10 includes a ram air fan (RAF) 12 located at the fan inlet 14. A ram air flow (AF) flows into the fan inlet 14 and through an air pathway extending through the interior of the outer housing 11. The ram air flow (AF) may flow to a heat exchanger (not depicted) and/or overboard through the fan outlet 16. The outer housing may further include a fan cap 13, which surrounds the fan inlet 14.

Figure 2:
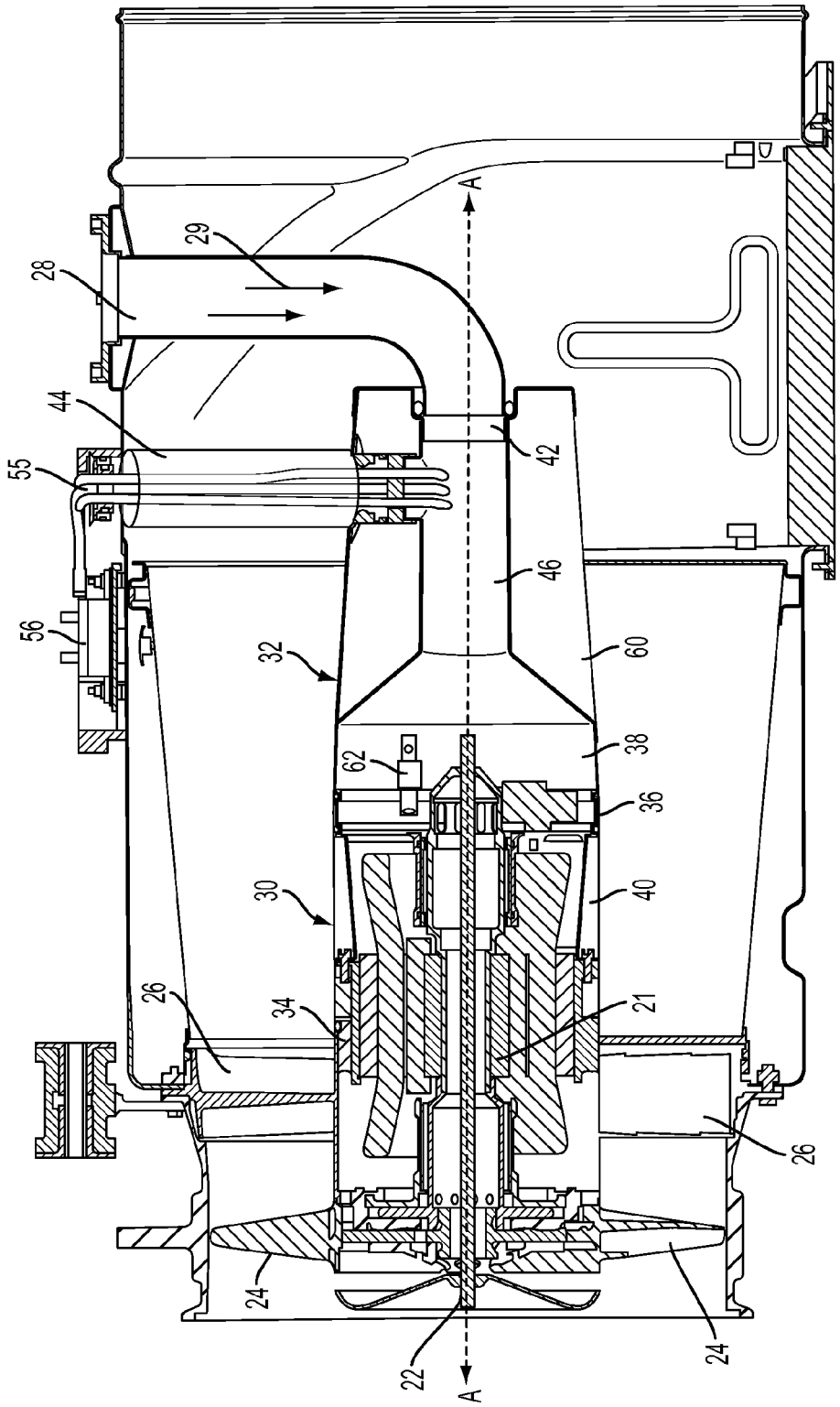
FIG. 2 is a diagram illustrating an interior of the ram fan assembly shown in FIG. 2.

The RAF 12 includes a rotor assembly 18 and a strut assembly 20. Referring to FIG. 2, the rotor assembly 18 is rotatably connected to a RAF motor 21, for example an electric motor, via a RAF shaft 22. The rotor assembly 18 includes a plurality of fan blades 24 extending radially from the rotor assembly 18 toward the fan cap 13. The RAF motor 21 drives the shaft 22, thereby rotating the fan blades 24 about the shaft 22 to urge additional air flow through the fan inlet 14. The strut assembly 20 is stationary with respect to the rotor assembly 18 and includes a plurality of strut blades 26 fixed thereto. Each strut blade 26 extends radially from the strut assembly 20 toward the outer housing 11. A cooling air duct 28 may be provided to draw cool air 29 into the outer housing 11 of the ram fan assembly 10. The flow of cool air 29 is driven generally via a pressure differential between the cooling air duct 28 and the fan inlet 14.

The ram fan assembly 10 further includes a motor/bearing housing 30 and an inner housing assembly 32. The motor/bearing housing 30 is disposed within the outer housing 11 and extends between the strut assembly 20 and the inner housing assembly 32. The motor/bearing housing 30 may contain one or more bearings and the RAF motor 21 used to drive the shaft 22. More specifically, the motor/bearing housing 30 assembly includes a first end 34 coupled to the strut assembly 20 and a second end 36 coupled to an outlet 38 of the inner housing assembly 32. The second end 36 of the motor/bearing housing 30 may include one or more holes for receiving a bolt that extends horizontally, i.e., parallel with the length of the motor/bearing housing 30, and therethrough to fasten a bracket as discussed in greater detail below. An outer layer 40 may wrap around and cover the motor/bearing housing 30. The outer layer 40 may be formed from metal including, but not limited to, titanium.

The inner housing assembly 32 includes a cool air inlet 42, a convolute 44, the outlet 38, and an inner duct 46. The cool air inlet 42 is coupled in fluid communication with the cooling air duct 28 to receive the flow of cool air 29. Referring to an embodiment illustrated in FIG. 3, the cool air inlet 42 includes an annular shape that defines an outer edge 48 having a first radius and an inner edge having a second radius that defines an inlet to receive the flow of cool air 29. The second radius defining the inlet is less than the first radius of the outer edge 48. The cool air inlet 42 may further include a groove 50 formed between the inlet and the outer edge 48. The groove 50 defines an outer lip 52 having a first length extending from the outer edge 48, and an inner lip 54 extending from the inner edge that defines the inlet. The inner lip 54 may have a second length that is greater than the first length of the outer lip 52.

The convolute 44 provides a wiring path, which conveys one or more wires 55 from the RAF motor 21 disposed in the motor/bearing housing 30 to a motor controller 56 that controls operation of the RAF motor 21. The inner duct 44 connects the cooling air inlet 42 and the outlet 38 with one another. In at least one embodiment, a first end of the inner duct 46 is fitted into the inlet defined by the inner lip 54 of the cooling air inlet 42, and a second end of the inner duct 46 is coupled in fluid communication with the outlet 38. Accordingly, cool air 29 drawn from the cool air duct 28 may flow into the cooling air inlet 42 and to the outlet 38.

As discussed above, the outlet 38 is in fluid communication with the motor/bearing housing 38 (see FIG. 2). The outlet 38 may have a conical shape such that the radial portion that connects to the motor/bearing housing 30 has a greater radius than the radial portion connected to the inner duct 46. The flow of cool air 29 may be drawn through the cooling air duct 28, directed through the inner duct 46 and exhausted from the outlet 38 into the motor/bearing housing 30 to flow across the RAF motor 21 and bearings. Accordingly, heat realized by the motor 21 and bearings located in the motor/bearing housing 30 may be reduced.

The outlet 38 may further include one or more slots 58 for receiving a bolt that extends therethrough to fasten a bracket, as discussed in greater detail below. In at least one embodiment, the outlet 38 includes first and second slots 58, 58'. The slots may be shaped as an ellipse, for example an oval-shape. The slots may also formed at locations of the outlet such that movement of the inner housing assembly 38 along the axial direction is limited by contact between an inner edge surround the slot and a bolt disposed through the slot 58, 58'. More specifically, since a bolt disposed through a respective slot 58, 58', the inner housing assembly 38 may be inhibited from moving in the axis direction when the inner edge surrounding the slot 58, 58' makes contact against the bolt. Hence, the bolt prevents the inner housing assembly 38 from moving therebeyond in the axis direction. Therefore, the bolts may be formed in the outlet 38 such that the inner housing is inhibited from applying excessive force to the cooling air duct 28.

Figure 4:
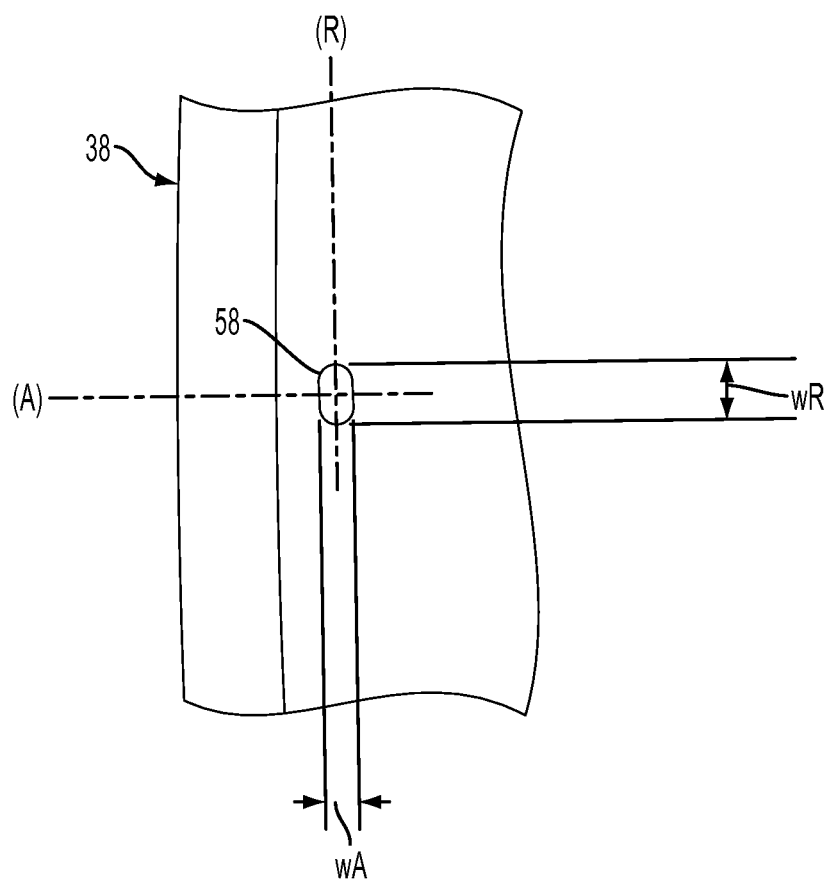
FIG. 4 is a diagram illustrating slots formed in an outlet of the inner housing assembly illustrated in FIG. 3.

Referring to FIG. 4, each slot 58, 58' extends along a first direction parallel to the horizontal length to define an axial width, and a second direction perpendicular to the horizontal length to define a radial width being greater than the axial width. The axial width may range from approximately 0.2 inches (0.508 cm) to approximately 0.3 inches (0.762 cm), and the radial width may range from approximately 0.35 inches (0.889 cm) to approximately 0.4 inches (1.016 cm). More specifically, the slots 58, 58' may have an axial width (wA) of approximately 0.240 inches (approximately 0.60 cm), and a radial width (wR) of approximately 0.375 inches (approximately 0.95 cm). Accordingly, the inner housing assembly may be afforded slightly more clearance along the radial direction, i.e., a direction parallel to the radial axis (R) than in the axial direction, i.e., the direction along the horizontal axis (A), as discussed in greater detail below.

Figure 5:
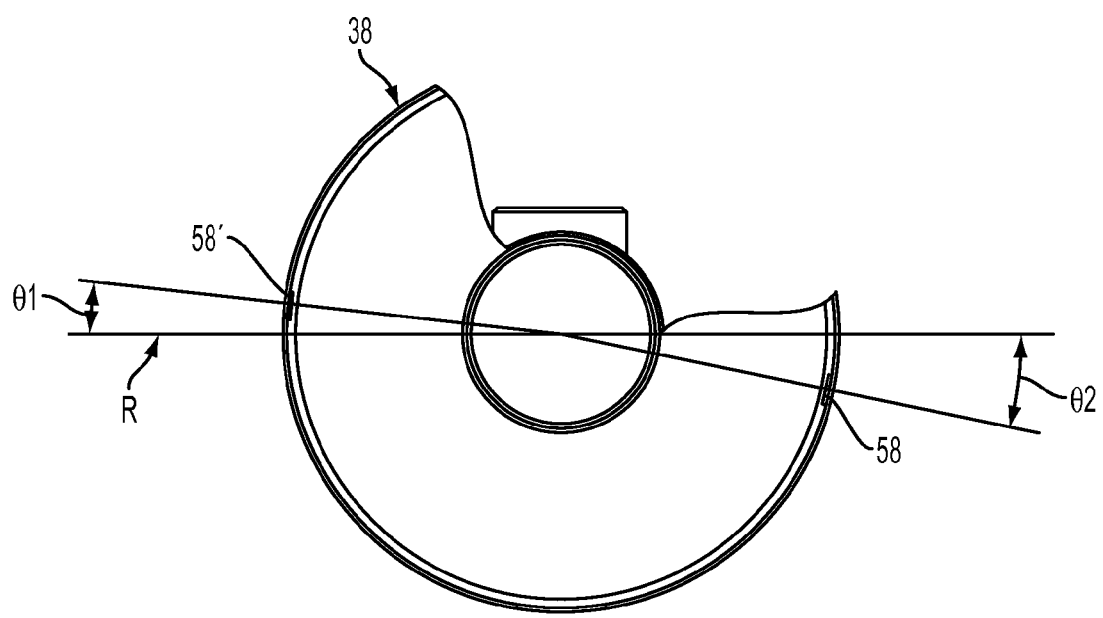
FIG. 5 is a cross-section of an outlet of the image housing assembly illustrated in FIG. 3 taken along C-C' according to an embodiment.

The slots 58, 58' may also be off-set from one another by a predetermined angle ($\theta$). A cross-section of the outlet 38 taken along line C-C' is illustrated in FIG. 5. The first slot 58 is formed above the radial axis (R) of the outlet 38 at a predetermined first angle ($\theta 1$), for example approximately 6.50 degrees (6.50°). The second slot 58' is formed below the radial axis (R) at a predetermined second angle ($\eta 2$), for example 11.5°. Accordingly, the first and second slots 58, 58' may be offset from one another by approximately 18.0°, i.e., $\theta = \theta 1 + \theta 2$.

Figure 3:
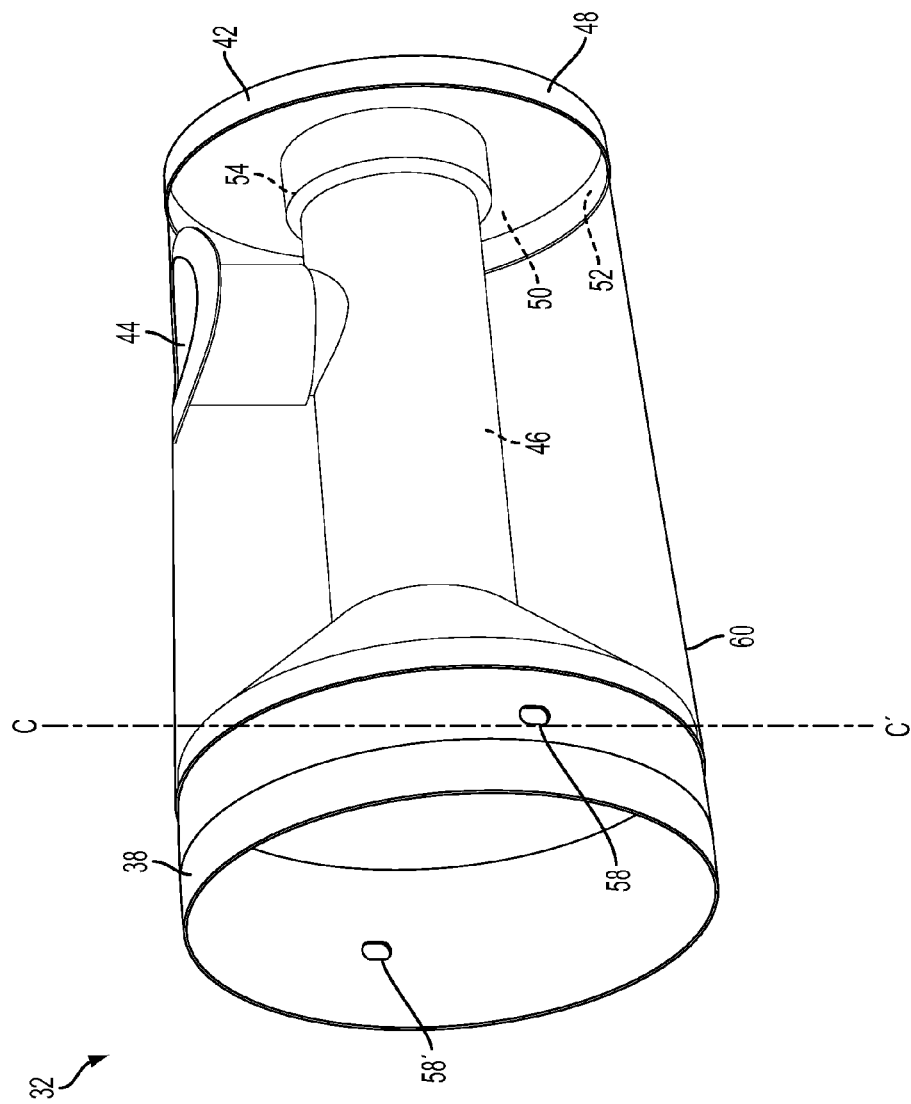
FIG. 3 is a diagram illustrating an inner housing assembly of the ram fan assembly shown in FIGS. 1 and 2.

The inner housing assembly 32 may further include an inner housing cover 60 that extends between the outlet 38 and the cooling air inlet 42, as illustrated in FIGS. 1-3. The inner housing cover 60 includes a first cover end and a second cover end. In at least one embodiment, the first cover end is coupled to an outer portion of the outlet 38 using, for example, one or more bolts The second cover end is fitted into the grove 50 of the cooing air inlet 42 and is disposed against an inner surface of the outer lip 52. Accordingly, the outer lip 52 may support the inner housing cover 60, and may prevent the second cover end from becoming detached from the cooing air inlet 42. As discussed above, the slots may also formed at locations of the outlet 38 such that movement of the inner housing assembly 38 along the axial direction is limited by contact between the inner edge surround the slot and a bolt disposed through the slot 58, 58.

The ram fan assembly 10 may further include one or more brackets 62 that couple together the motor/bearing housing 30 and the inner housing assembly 32. In at least one embodiment, first and second brackets 62 are coupled to inner walls of the motor/bearing housing 30 and the inner housing assembly 32 to prevent separation of the motor/bearing housing 30 from the inner housing assembly 32.

Figure 6:
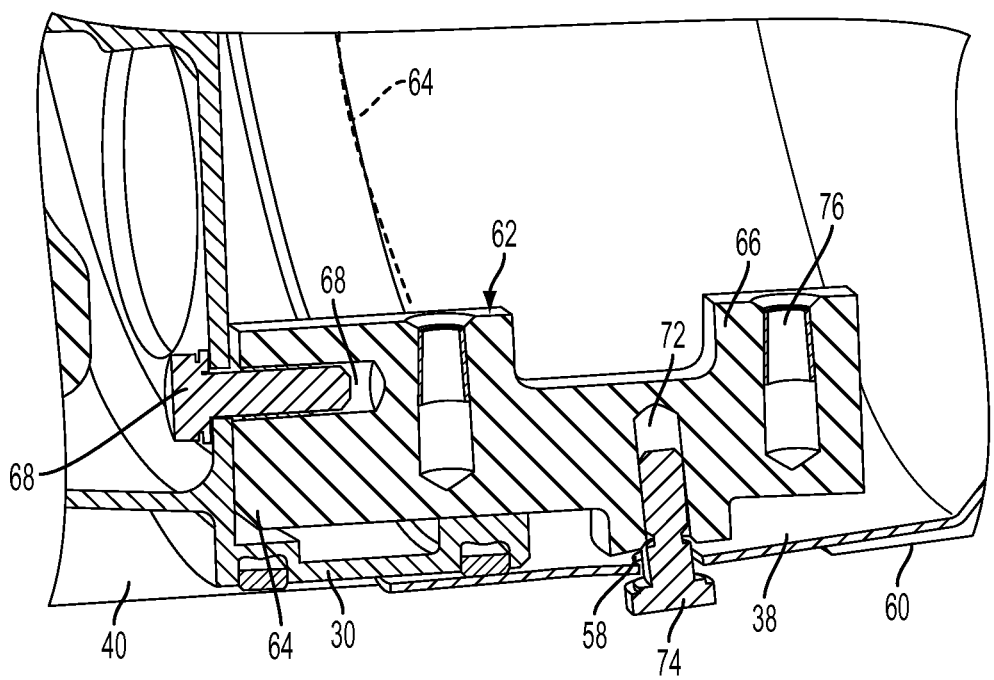
FIG. 6 is a diagram of bracket included with the ram fan assembly according to an embodiment.

Referring to FIG. 6, a joint 64 exists where the motor/bearing housing 30 contacts the inner bearing assembly 32. The bracket 62 may extend horizontally, i.e., along the X-axis, across the joint 64 to prevent the motor/bearing housing 30 and inner bearing assembly 32 from disconnecting thereat. In other words, the one or more brackets 62 maintain coupling of the motor/bearing housing 30 and the inner housing assembly 32 at the joint 64.

The bracket 62 includes a body that extends between a first end 64 and a second end 66. The first end 64 may be coupled against an inner surface of the motor/bearing housing 30, and the second end 66 may be coupled against an inner surface of the inner housing assembly 32. In at least one embodiment, the bracket 62 is formed from, for example, aluminum. The first end 64 includes a horizontal channel 68 that extends horizontally into the bracket 62 to receive a horizontal bolt 70. The second end 66 includes a vertical channel 72 that extends perpendicular to the horizontal channel 68 and into the bracket 62 to receive a vertical bolt 74. The horizontal channel 68 of the bracket 62 may be aligned with the hole formed in the motor/bearing housing 30, while the vertical channel 72 of the bracket 62 may be aligned with one of the first or second slots 58, 58' formed in the outlet 38 of the inner housing assembly 32. Accordingly, the horizontal bolt 68 may be disposed through the hole and into horizontal channel 68 to fasten the first end 64 of the bracket 62 to the motor/bearing housing 30, and the vertical bolt 74 may be disposed through the slot 58, 58' and into vertical channel 72 to fasten the second end 66 of the bracket 62 to the inner housing assembly 32. The bracket 62 may further include one or more helical coil inserts 76 that support a P-clamp (not shown), which is used to provide strain relief to the wires 55 fed through the motor/bearing housing 30 and the inner housing assembly 32.

As illustrated in FIGS. 7A-7B, the slots 58, 58' may be formed such that a clearance exists between a surface of the outlet 38 and the vertical bolt 74 to tolerate vibration from the inner housing assembly 32. In at least one embodiment, for example, the slots 58, 58' may have an axial clearance distance (dA) ranging from approximately 0.036 inches (approximately 0.091 cm) to approximately 0.014 inches (approximately 0.035 cm), and a radial clearance distance (dR) ranging from approximately 0.104 inches (approximately 0.264 cm) to approximately 0.082 inches (approximately 0.208 cm). The clearance distances (dA, dR), therefore, allow the slots 58, 58' to sustain tolerances, such as vibrations and movements from the inner housing assembly 32, without overstressing adjacent components and without allowing the inner housing assembly 32 to substantially move and become disengaged from the motor/bearing housing 30.

As described in detail above, at least one embodiment of the present inventive teachings includes a bracket having a first end coupled to the motor/bearing housing and a second end coupled to the inner housing assembly. Accordingly, the bracket may prevent the inner housing assembly from disengaging from the motor/bearing housing as air flow generated by the RAF flows within the RAF ram fan assembly.

While the present inventive teachings have been described in detail in connection with only a limited number of embodiments, it should be readily understood that the present inventive teachings are not limited to such disclosed embodiments. Rather, the inventive teachings may be modified to incorporate any number of variations, alterations, substitutions or equivalent arrangements not heretofore described, but which are commensurate with the spirit and scope of the invention. Additionally, while various embodiments of the present inventive teachings have been described, it is to be understood that features of the inventive teachings may include only some of the described embodiments. Accordingly, the inventive teachings are not to be seen as limited by the foregoing description.

What is claimed is:

1. A bracket to couple an inner housing assembly to a motor/bearing housing of a ram fan assembly, the bracket comprising:
   a body extending between first and second ends in a first direction extending parallel to a horizontal length of the ram fan assembly;
   a first channel formed in the first end, the first channel configured to receive a first bolt to couple the first end to the motor/bearing housing, the first channel extending a first channel axis that is parallel to the horizontal length to receive the first bolt so as to define a horizontal channel; and
   a second channel formed in the second end, the second channel configured to receive a second bolt to couple the second end to the inner housing assembly, the second channel extending along a second channel axis that is perpendicular to the horizontal length to receive the second bolt so as to define a vertical channel;
   wherein the vertical channel is aligned with a slot formed in the inner housing assembly and the bracket is exposed therethrough, the slot defining a first clearance extending in an axial direction between the inner housing assembly and the second bolt to expose a first portion of the bracket, and defines a second clearance different from the first clearance extending in a radial direction perpendicular to the axial direction to expose a second portion of the bracket, and
   wherein the body extends between the first and second ends to define an opposing pair of first and second bracket sides, the first and second ends extending perpendicular to the bracket sides, wherein the first channel includes a first opening and a first closed end, the first opening extending from one end among the first and second bracket ends to the first closed end,
   wherein the second channel includes a second opening and a second closed end, the second opening extending from the first bracket side to the second closed end, and wherein the first channel axis extends between the second closed end of the second channel and the second bracket side located opposite the first bracket side.

2. The bracket of claim 1, wherein a first size of the first portion of the bracket exposed via the slot is less than a second size of the second portion of the bracket exposed via the slot.

3. The bracket of claim 1, wherein the first closed end is between the second bracket side and the second closed end.

* * * * *